United States Patent
Cerny

(10) Patent No.: US 10,981,059 B2
(45) Date of Patent: Apr. 20, 2021

(54) ASSET AWARE COMPUTING ARCHITECTURE FOR GRAPHICS PROCESSING

(71) Applicant: SONY Interactive Entertainment LLC, San Mateo, CA (US)

(72) Inventor: Mark E. Cerny, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 16/503,378

(22) Filed: Jul. 3, 2019

(65) Prior Publication Data

US 2021/0001220 A1    Jan. 7, 2021

(51) Int. Cl.
| | |
|---|---|
| *A63F 13/52* | (2014.01) |
| *G06T 1/60* | (2006.01) |
| *G06T 1/20* | (2006.01) |

(52) U.S. Cl.
CPC ............ *A63F 13/52* (2014.09); *G06T 1/20* (2013.01); *G06T 1/60* (2013.01)

(58) Field of Classification Search
None
See application file for complete search history.

(56) References Cited

U.S. PATENT DOCUMENTS

| | | | |
|---|---|---|---|
| 8,243,064 B1 | 8/2012 | Moravanszky et al. | |
| 10,049,646 B2 * | 8/2018 | Diard | A63F 13/34 |
| 2008/0018652 A1 * | 1/2008 | Toelle | G06T 15/005 |
| | | | 345/506 |
| 2010/0091028 A1 | 4/2010 | Grossman et al. | |
| 2010/0231588 A1 | 9/2010 | Barczak | |
| 2014/0098117 A1 | 4/2014 | Goel et al. | |
| 2015/0264298 A1 * | 9/2015 | Colenbrander | G06F 3/14 |
| | | | 345/547 |
| 2017/0200252 A1 | 7/2017 | Nguyen et al. | |

OTHER PUBLICATIONS

ISR & Written Opinion, PCT/US2020/032954, dated Jul. 21, 2020, 12 pages.

* cited by examiner

*Primary Examiner* — Ronald Laneau
(74) *Attorney, Agent, or Firm* — Penillia IP, APC

(57) ABSTRACT

A method for executing a game by a computing system that uses a central processing unit (CPU) and graphics processing unit (GPU) for generating video frames. A draw call is generated for a video frame by the CPU. At bind time, i.e. writing of the GPU commands by the CPU using a GPU API, asset aware data (AAD) is written to the command buffer, and loading of one or more level of detail (LOD) data from an asset store to system memory is requested. The GPU executes the draw call for the frame using LOD data written to the system memory, the GPU using at least a minimum of LOD data based on the AAD. Additionally, the GPU uses information regarding the LOD load state when executing the draw call, in order to avoid access to LODs not yet loaded.

28 Claims, 9 Drawing Sheets

ASSET AWARE COMPUTING ARCHITECTURE FOR GRAPHICS PROCESSING

TECHNICAL FIELD

The present disclosure is related to computing system architectures, and more specifically to a computing system architecture that includes asset aware components including a central processing unit and a graphics processing unit when generating video frames for a game or other interactive application.

BACKGROUND OF THE DISCLOSURE

Video gaming provides for gameplay within a virtualized gaming world. Different scenes of the gaming world can be created through execution of the corresponding game. The scenes may be generated using assets of various types, such as textures and models. These assets are used by a graphics processor to generate the scenes. The assets are too large to all fit in system memory simultaneously, so the assets are typically stored on optical media, hard drives or solid state devices and loaded to system memory when needed. Consequently, the user may experience long delays while assets are loaded, and managing the loading of assets to system memory and freeing up system memory to receive additional assets may form a significant burden for game developers. As such, game developers may reduce the complexity of scenes in order to reduce the user delays and the required asset management, but with the result of a less immersive experience to the player.

It is in this context that embodiments of the disclosure arise.

SUMMARY

Embodiments of the present disclosure relate to a computing system architecture including a central processing unit and graphics processing unit that are configured for asset awareness when processing textures, models or other assets through a graphics pipeline, and a method for implementing the same. Asset awareness provides for identification of assets required for processing and to track the loading of those assets for use in the graphics pipeline. Also, asset awareness provides for knowing when the minimum of the assets (e.g. lower LODs) have been loaded for processing through the graphics pipeline, thereby reducing the effects of any stalling of the graphics pipeline, especially when transitioning between scenes of a virtualized gaming world.

Embodiments of the present disclosure disclose an asset aware computing architecture configured to manage the loading of assets into system memory when the assets are required by the graphics pipeline and the freeing of system memory when the assets are no longer needed. The computing architecture includes an asset store configured with memory devices providing fast access thereby allowing assets for a scene drawn in a video frame to be loaded to system memory in milliseconds or tens of milliseconds. In particular, assets are loaded to system memory from the asset store using a bind time trigger. In that manner, the load of assets for one or more draw calls used to render a video frame is triggered when the asset is bound (e.g., at bind time) to a corresponding draw call and when the central processing unit (CPU) executing the game uses a graphics application programming interface (API) to construct one or more command buffers for the draw calls as executed by a graphics processing unit (GPU) implementing a graphics pipeline. Because the computing architecture is asset aware, the GPU is able to execute using a minimum of the required assets for one or more draw calls for a video frame without waiting for the required assets to fully load. An asset store controller is configured to control management of assets in the asset store and the delivery of assets throughout the asset aware computing architecture. The asset store controller may be software running on the CPU with an assist from other on-chip units, in one embodiment. The asset store controller may alternatively be an on-chip complex containing co-processors, such as additional CPUs. Both the CPU and GPU may be modified for integration and/or interfacing with the asset store controller. The asset store includes textures, models, and other data for the game. The asset store is much larger than system memory. The asset store is aware of its contents, including assets that are identified and/or tagged using asset identifiers (asset IDs), and details of the contents and/or assets (e.g., level of details for a corresponding asset). The asset store is updated in an asset-aware fashion in various ways, such as when assets are generated locally, or when assets are accessed from mass storage within rack, or when assets are accessed from within data center, or when assets are delivered over a network, etc. Conventionally, the game executing on the CPU uses the GPU API to bind one or more assets (e.g., texture, level of details—LODs, models, etc.) to a draw call, enabling the assets to be used in the object being rendered by the draw call. In the asset aware computing architecture, the GPU API receives additional information from the game executing on the CPU. For example, for each draw call the additional asset aware data (AAD) includes the asset ID of the asset used for the draw call, the minimum LOD that must be loaded for the asset before the draw call can be executed in the graphics pipeline, and a priority of the loading of that asset in comparison to other loads of assets used by the draw call. The GPU API is configured to put at least some of the AAD in the command buffer for a corresponding draw call (e.g., asset ID, minimum LOD, etc.) and passes at least some if not all of the AAD to the to the asset store controller. In addition, the GPU API may also be used to notify the asset store controller when each video frame of rendering is complete, e.g. by putting a command in the command buffer. As such, in the asset aware architecture, the asset store controller is receiving a stream of AAD, such as at least all of the assets needed for a video frame, with prioritization information; and notification of the end of rendering that used those assets, etc. Upon receiving the AAD, the asset store controller begins to load the assets from the asset store into system memory. The loading process uses loading priorities. For example, the "minimum LOD" could be loaded for all textures and/or models and/or other assets, then the loading of higher LODs could be performed based on the loading priority information for assets. On completion of the load, the GPU is notified (e.g., using the asset ID) that the asset has been loaded or is being loaded and to what degree it is loaded (e.g., which LODs have been loaded for an asset). In some embodiments, there may be "emergency loads" of assets, if the rendering (e.g., execution of a corresponding draw call in the graphics pipeline) has started and the required assets for that draw call has not yet been loaded. In other embodiments, conditional commands in the command buffer may be used to query load status of the LOD data and alter the command flow, e.g. to skip a draw call entirely if the minimum LOD data has not been loaded (i.e. to avoid a stall in the GPU), to render using proxy assets or to allow for customized rendering based on the loaded LODs. In still other embodiments, the GPU may use the AAD to make these same determinations, e.g. to skip a draw call entirely if the minimum LOD data has not been loaded (i.e. to avoid a stall in the GPU). The asset store controller is also configured to free up memory that is not needed, such as when an asset has not been used during the rendering of a frame and therefore the memory space storing that asset may be freed. The GPU may be modified to be asset aware. For example, when an object is rendered, the GPU recognizes whether the required LODs of the asset have been loaded or not. The GPU is able to issue an "emergency load" request for the required LODs and then stall until the required LODs are loaded. In addition, the GPU recognizes what the highest LOD that has been loaded into memory is for a particular asset, and render a corresponding video frame using up to that highest LOD—but not beyond that highest LOD. Manipulation of page tables, CPU caches and GPU caches may be required as part of the loading and freeing of system memory, and therefore the asset store controller, the CPU and the GPU may be configured to accelerate these operations. In that manner, from the perspective of a game executing on the CPU, the required assets for corresponding draw calls "magically" show up in system memory in time to be used. That is, the game need only make a draw call using the GPU API and the required assets (e.g., minimum LOD) are ready for use in the graphics pipeline.

In one embodiment, a method for executing a game by a computing system that uses a central processing unit and graphics processing unit for generating video frames is disclosed. The method includes generating a draw call for a video frame of the video frames by the CPU. The method includes writing one or more commands for the draw call to a command buffer at a bind time. The method includes writing asset aware data (AAD) using a GPU API for the draw call to the command buffer at the bind time, and begin loading at the bind time one or more level of detail (LOD) data from an asset store to a system memory used by the computing system. The method includes executing by the GPU the draw call for the frame using LOD data written to the system memory, the GPU using at least a minimum of LOD data based on the AAD.

In another embodiment, a computing system for executing a game to generate video frames is disclosed. The computing system includes a central processing unit configured for executing the game. The CPU generates a draw call for a frame of the video frames, wherein the draw call includes commands. The computing system includes a command buffer configured for storing asset aware data and the commands for the draw call, the AAD and the commands being written into the command buffer by the CPU using a GPU API at a bind time. The computing system includes an asset store configured for storing a plurality of assets of the application including one or more level of details for an asset used by the draw call. The computing system includes a system memory configured for storing one or more level of detail data used by the draw call, the load of the LOD data from the asset store being triggered by the CPU at the bind time, wherein the LOD data begins loading to system memory while writing the AAD to the command buffer. The computing system includes a graphics processing unit configured for executing the commands of the draw call for the frame using LOD data written to the system memory, the GPU using at least a minimum of LOD data based on the AAD.

In still another embodiment, a non-transitory computer-readable medium storing a computer program for executing a game by a computing system that uses a central processing unit and a graphics processing unit for generating video frames is disclosed. The non-transitory computer-readable medium includes program instructions for generating a draw call for a video frame of the video frames by the CPU. The non-transitory computer-readable medium includes program instructions for writing one or more commands for the draw call to a command buffer at a bind time. The non-transitory computer-readable medium includes program instructions for writing asset aware data (AAD) for the draw call to the command buffer at the bind time using a GPU API, and begin loading at the bind time one or more level of detail (LOD) data from an asset store to a system memory used by the computing system. The non-transitory computer-readable medium includes program instructions for executing by the GPU the draw call for the frame using LOD data written to the system memory, the GPU using at least a minimum of LOD data based on the AAD.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1A:
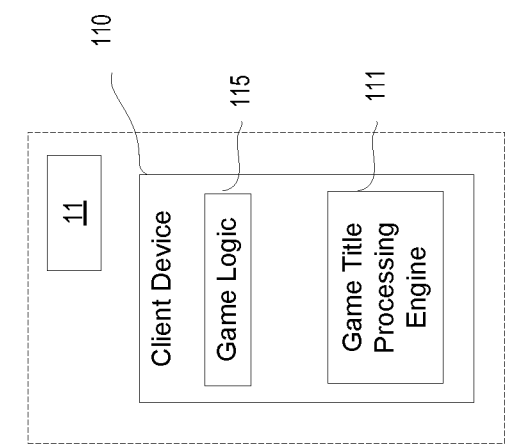
FIG. 1A is a diagram of a system for providing gaming, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe a computing system architecture including asset aware components such as a central processing unit and a graphics processing unit that generate video frames through a graphics pipeline, and a method for implementing the same. Asset awareness by the CPU and GPU provides for identification and tracking of assets used in the graphics pipeline, such that a minimum of assets (e.g., minimum level of detail—LOD) can be used for processing through the graphics pipeline when generating a corresponding video frame. In particular, the game code executing on the CPU may anticipate when assets are needed in order to load those assets into system memory in a timely fashion. For example, assets may be textures and/or models that are processed through shader programs of a graphics pipeline to generate video frames that are displayed through pixels of a display. For example, a forest scene may take as input tree textures that are processed through the graphics pipeline. In the case where there may be not enough time to load large amounts of LOD data for textures and/or models into system memory for processing, to avoid stalling the GPU embodiments of the present disclosure provide for asset awareness such that the GPU is configured to track loading of identified assets and to use at least minimums of LODs of assets to generate the scene. Initially, the scene may be rendered with low resolution, but in subsequent frames the scene may be rendered using more complete LOD data. In that manner, large and complex scenes of a virtualized gaming world may be efficiently generated through the graphics pipeline while reducing the chance of stalling the GPU to wait for asset loading. This is especially beneficial when encountering a scene-cut within a game, wherein the game transitions from one scene to another between two video frames (e.g. a scene change in a cinematic sequence, or start of interactive gameplay after a series of menus). Instead of waiting for the entire LOD data to load to generate the new scene, a minimum of LOD data may be loaded for each necessary asset for processing through the graphics pipeline to generate a corresponding video frame. By reducing GPU stalling even while rendering complex scenes, for example, the immersive experience of the user playing the game is greatly enhanced.

With the above general understanding of the various embodiments, example details of the embodiments will now be described with reference to the various drawings.

Throughout the specification, the reference to "game" or "video game" or "gaming application" is meant to represent any type of interactive application that is directed through execution of input commands. For illustration purposes only, an interactive application includes applications for gaming, word processing, video processing, video game processing, etc. Further, the terms introduced above are interchangeable.

FIG. 1A is a diagram of a system 100A for providing gaming, in accordance with one embodiment of the present disclosure. As shown, a game is being executed locally on client device 110 (e.g., game console) of a corresponding user that is playing the game. In particular, an instance of a game is executing by the game title processing engine 111. Client device 110 may be operating in a single-player mode for the user. Game logic 115 (e.g., executable code) implementing the game is stored on the client device 110, and is used to execute the game. For purposes of illustration, game logic 115 may be delivered to client device 110 through a portable medium (e.g. optical media) or through a network (e.g., downloaded through the internet from a gaming provider).

In one embodiment, the game title processing engine 111 of client device 110 includes basic processor based functions for executing the game and services associated with the gaming application. For example, processor based functions include 2D or 3D rendering, physics, physics simulation, scripting, audio, animation, graphics processing, lighting, shading, rasterization, ray tracing, shadowing, culling, transformation, artificial intelligence, etc. In addition, services for the gaming application include memory management, multi-thread management, quality of service (QoS), bandwidth testing, social networking, management of social friends, communication with social networks of friends, communication channels, texting, instant messaging, chat support, etc. In particular, client device 110 is configured as a computing system architecture including asset aware components such as a central processing unit and a graphics processing unit that generate video frames through a graphics pipeline. In that manner, the computing system architecture is configured to identify, track, and use at least a minimum of LOD data for assets used in the graphics pipeline (e.g., executing draw calls) when generating a corresponding video frame.

Client device 110 may receive input from various types of input devices, such as game controllers, tablet computers, keyboards, gestures captured by video cameras, mice, touch pads, etc. Client device 110 can be any type of computing device having at least a memory and a processor module, and is configured for generating rendered images executed by the game title processing engine 111, and for displaying the rendered images on a display (e.g., display 11, or display 11 including a head mounted display—HMD, etc.). For example, the rendered images may be associated with an instance of the game executing locally on client device 110 to implement gameplay of a corresponding user, such as through input commands that are used to drive gameplay. Some examples of client device 110 include a personal computer (PC), a game console, a home theater device, a general purpose computer, mobile computing device, a tablet, a phone, or any other types of computing devices that can execute an instance of a game.

Figure 1B:
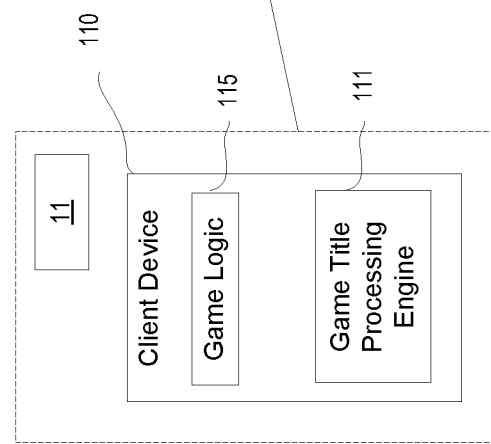
FIG. 1B is a diagram of a system for providing gaming having back-end cloud game network providing support services, in accordance with one embodiment of the present disclosure.

FIG. 1B is a diagram of a system 100B for providing gaming having a back-end cloud game network providing support services, in accordance with one embodiment of the present disclosure. As shown, a game is being executed locally on client device 110 (e.g., game console) of a corresponding user that is playing the game, wherein client device 110 was previously introduced in FIG. 1A. In particular, an instance of a game is executed by the game title processing engine 111, as previously described. That is, the game title processing engine 111 of client device 110 includes basic processor based functions for executing the game and services associated with the gaming application. Game logic 115 (e.g., executable code) implementing the game is stored on the client device 110, and is used to execute the game. As previously described, client device 110 includes asset aware components such as a central processing unit and a graphics processing unit that generate video frames through a graphics pipeline. In that manner, the computing system architecture including the CPU and GPU is configured to identify, track, and use at least a minimum of LOD data for assets used in the graphics pipeline (e.g., executing draw calls) when generating a corresponding video frame.

Game server 160 may be configured to support one or more local computing devices supporting a plurality of users, wherein each local computing device may be executing an instance of a corresponding game, such as in single-player or multi-player mode. For example, in a multi-player mode, while the game may be executing locally, the cloud game network 190 concurrently receives information (e.g., game state data) from each local computing device over network 150 and distributes that information accordingly throughout one or more of the local computing devices so that each user is able to interact with other users (e.g., through corresponding characters in the game) in the virtualized gaming world of the multi-player game. In that manner, the cloud game network 190 coordinates and combines the gameplays for each of the users within the multi-player gaming environment by passing information through network 150. The network 150 may include one or more communication technologies. In some embodiments, network 150 may include $5^{th}$ Generation (5G) network technology having advanced wireless communication systems.

Also, in either single-player or multi-player mode, the cloud game network may provide additional services to the client device 110. For example, the cloud game network 190 may store game state of one or more points in a gameplay of a user for purposes of back-up of gameplay, providing highlights of gameplay, generating mini-games based on recorded gameplay, providing artificial intelligence (AI) based information related to gameplay (e.g., support for gameplay), etc.

Figure 1C:
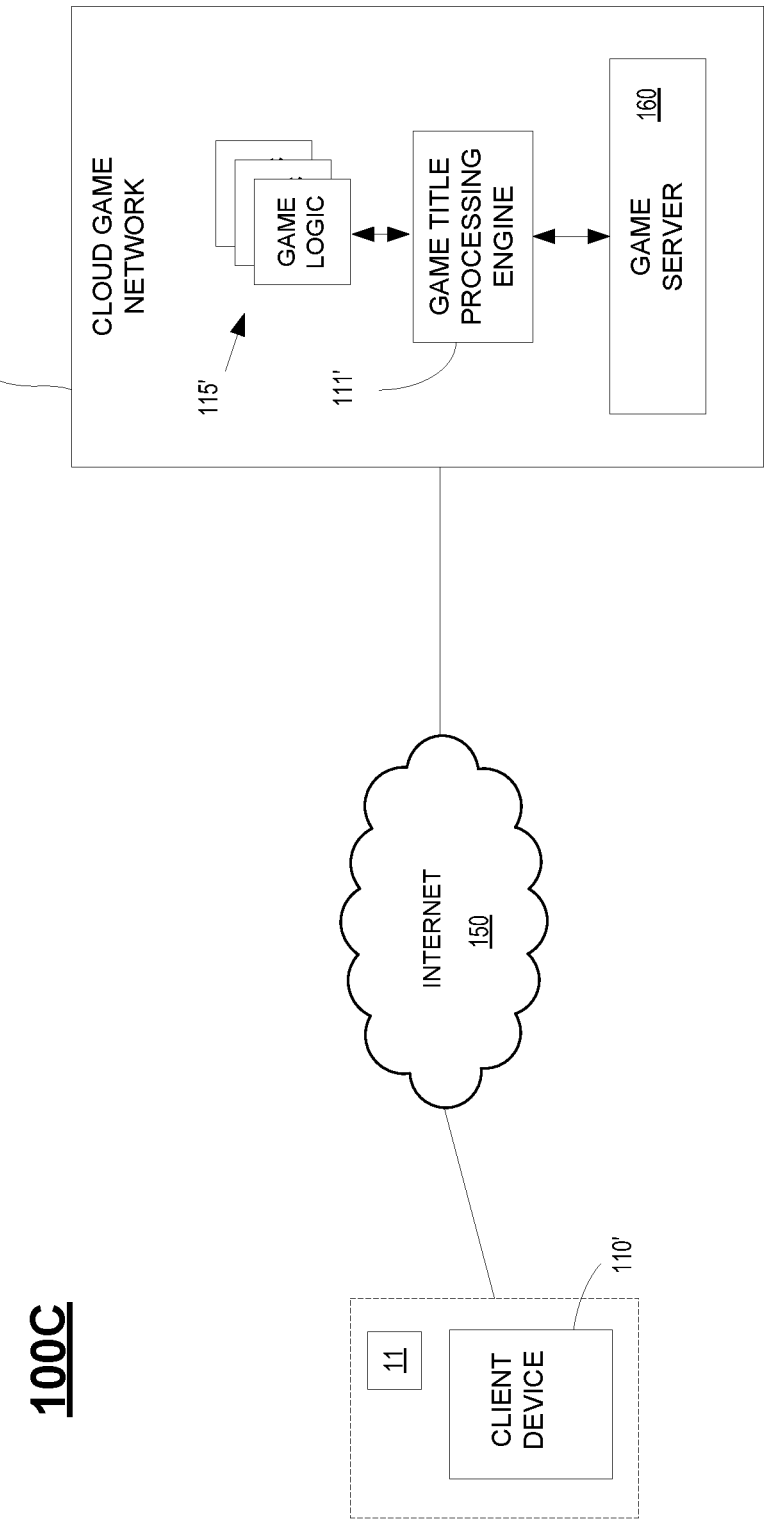
FIG. 1C is a diagram of a system for providing gaming over a cloud game network, in accordance with one embodiment of the present disclosure.

FIG. 1C is a diagram of a system 100C for providing gaming over a cloud game network 190, wherein the game is being executed remote from client device 110' (e.g., thin client) of a corresponding user that is playing the game, in accordance with one embodiment of the present disclosure. System 100C may provide gaming control to one or more users playing one or more games through the cloud game network 190 via network 150 in either single-player or multi-player modes. In some embodiments, the cloud game network may be a cloud game network 190 that includes a plurality of virtual machines (VMs) running on a hypervisor of a host machine, with one or more virtual machines configured to execute a game processor module utilizing the hardware resources available to the hypervisor of the host. Network 150 may include one or more communication technologies. In some embodiments, network 150 may include $5^{th}$ Generation (5G) network technology having advanced wireless communication systems.

As shown, the cloud game network 190 includes a game server 160 that provides access to a plurality of games. Game server 160 may be any type of server computing device available in the cloud, and may be configured as one or more virtual machines executing on one or more hosts. For example, game server 160 may manage a virtual machine supporting a game processor that instantiates an instance of a game for a user. As such, a plurality of game processors of game server 160 associated with a plurality of virtual machines is configured to execute multiple instances of one or more games associated with gameplays of a plurality of users. In that manner, back-end server support provides streaming of media (e.g., video, audio, etc.) of gameplays of a plurality of gaming applications to a plurality of corresponding users. That is, game server 160 is configured to stream data (e.g., rendered images and/or frames of a corresponding gameplay) back to a corresponding client device 110' through network 150. In that manner, a computationally complex gaming application may be executing at the back-end server in response to controller inputs received and forwarded by client device 110'. Each server is able to render images and/or frames that are then encoded (e.g., compressed) and streamed to the corresponding client device for display For example, a plurality of users may access cloud game network 190 via network 150 using corresponding client devices 110', wherein client device 110' may be configured similarly as client device 110 of FIGS. 1A-1B (e.g., including game executing engine 111, etc.), or may be configured as a thin client providing interfacing with a back end server configured for providing computational functionality (e.g., including game title processing engine 111').

For ease of illustration, a single client device 110' is shown supporting a corresponding user in FIG. 1C. In particular, client device 110' of a corresponding user (not shown) is configured for requesting access to games over a network 150, such as the internet, and for rendering instances of a game executed by the game server 160 and delivered to a display device associated with the corresponding user. For example, the user may be interacting through client device 110' with an instance of a game executing on game processor of game server 160. More particularly, an instance of the game is executed by the game title processing engine 111'. Corresponding game logic (e.g., executable code) 115' implementing the gaming application is stored and accessible through a data store (not shown), and is used to execute the game. Game title processing engine 111' is able to support a plurality of games using a plurality of game logics, each of which is selectable by the user.

For example, client device 110' is configured to interact with the game title processing engine 111' in association with the gameplay of a corresponding user, such as through input commands that are used to drive gameplay. In particular, client device 110' may receive input from various types of input devices, such as game controllers, tablet computers, keyboards, gestures captured by video cameras, mice, touch pads, etc. Client device 110' can be any type of computing device having at least a memory and a processor module that is capable of connecting to the game server 160 over network 150. The back-end game title processing engine 111' is configured for generating rendered images, which is delivered over network 150 for display at a corresponding display in association with client device 110'. For example, through cloud based services the rendered images may be delivered by an instance of a corresponding game executing on game executing engine 111' of game server 160. That is, client device 110' is configured for receiving rendered images, and for displaying the rendered images on display 11. In one embodiment, display 11 includes an HMD (e.g., displaying VR content). In some embodiments, the rendered images may be streamed to a smartphone or tablet, wirelessly or wired, direct from the cloud based services or via the client device 110' (e.g., PlayStation® Remote Play).

In one embodiment, game server 160 and/or the game title processing engine 111' includes basic processor based functions for executing the game and services associated with the gaming application. For example, processor based functions include 2D or 3D rendering, physics, physics simulation, scripting, audio, animation, graphics processing, lighting, shading, rasterization, ray tracing, shadowing, culling, transformation, artificial intelligence, etc. In addition, services for the gaming application include memory management, multi-thread management, quality of service (QoS), bandwidth testing, social networking, management of social friends, communication with social networks of friends, communication channels, texting, instant messaging, chat support, etc. In particular, game server 160 and/or the game title processing engine 111' are configured as a computing system architecture including asset aware components such as a central processing unit and a graphics processing unit that generate video frames through a graphics pipeline. In that manner, the computing system architecture is configured to identify, track, and use at least a minimum of LOD data for assets used in the graphics pipeline (e.g., executing draw calls) when generating a corresponding video frame.

In one embodiment, cloud game network 160 is a distributed game server system and/or architecture. In particular, a distributed game engine executing game logic is configured as a corresponding instance of a corresponding game. In general, the distributed game engine takes each of the functions of a game engine and distributes those functions for execution by a multitude of processing entities. Individual functions can be further distributed across one or more processing entities. The processing entities may be configured in different configurations, including physical hardware, and/or as virtual components or virtual machines, and/or as virtual containers, wherein a container is different from a virtual machine as it virtualizes an instance of the gaming application running on a virtualized operating system. The processing entities may utilize and/or rely on servers and their underlying hardware on one or more servers (compute nodes) of the cloud game network 190, wherein the servers may be located on one or more racks. The coordination, assignment, and management of the execution of those functions to the various processing entities are performed by a distribution synchronization layer. In that manner, execution of those functions is controlled by the distribution synchronization layer to enable generation of media (e.g., video frames, audio, etc.) for the gaming application in response to controller input by a player. The distribution synchronization layer is able to efficiently execute (e.g., through load balancing) those functions across the distributed processing entities, such that critical game engine components/functions are distributed and reassembled for more efficient processing.

The game title processing engines 111 and 111' of FIGS. 1A-1C include a CPU and GPU group that is configured to perform multi-tenancy GPU functionality, wherein one CPU and GPU group could be implementing graphics and/or rendering pipelines for multiple games, in one embodiment. That is, the CPU and GPU group is shared between multiple games that are being executed. The CPU and GPU group could be configured as one or more processing devices. In another embodiment, multiple GPU devices are combined to perform graphics processing for a single application that is executing on a corresponding CPU.

Figure 2:
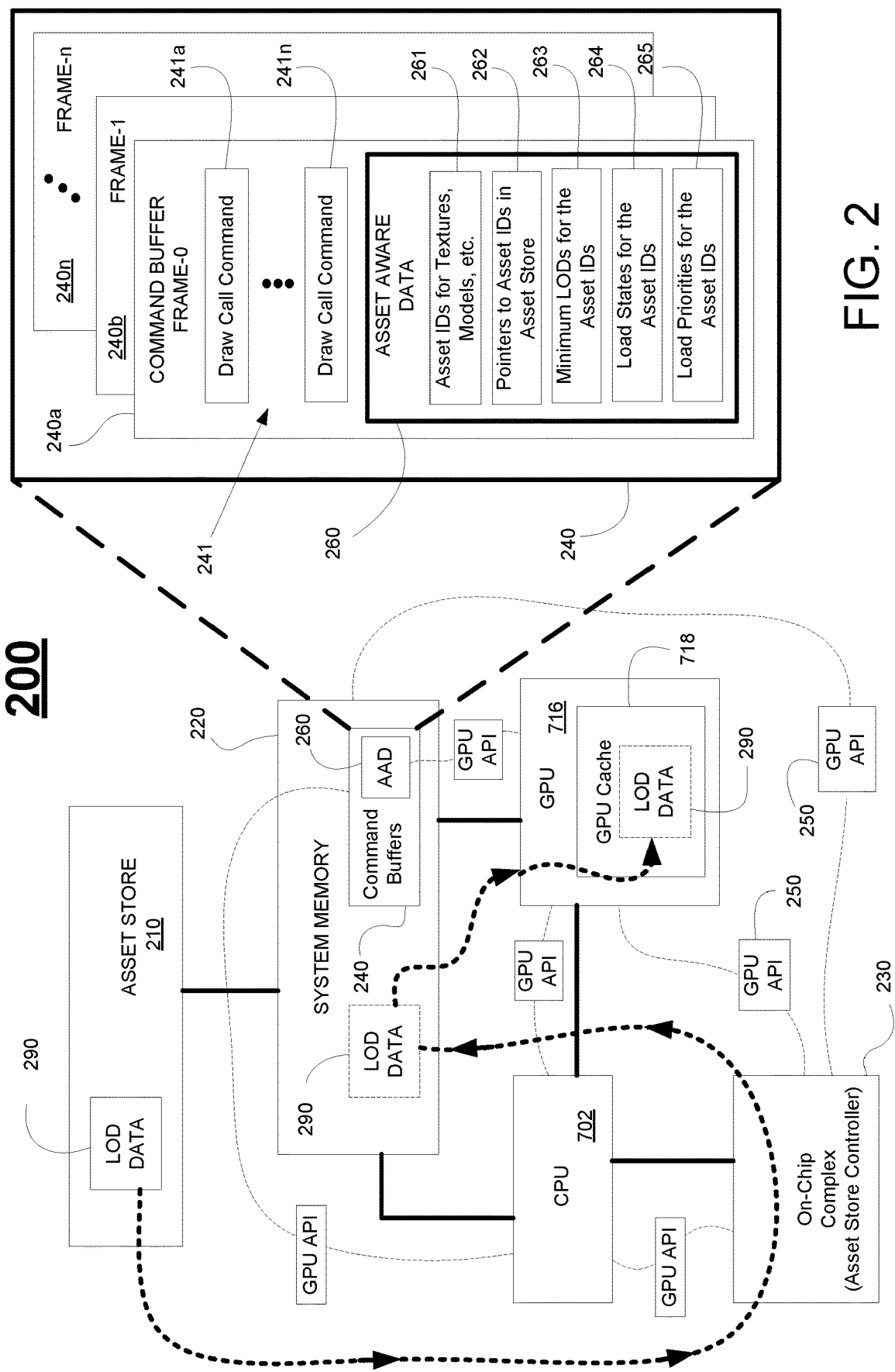
FIG. 2 illustrates a computing system including a central processing unit and a graphics processing unit that are asset aware when generating video frames while the CPU is executing a game, in accordance with one embodiment of the present disclosure.

FIG. 2 illustrates a computing architecture 200 including asset aware components, such as a central processing unit 702 and a graphics processing unit 716, that are asset aware when generating video frames while the CPU is executing a game, in accordance with one embodiment of the present disclosure. In particular, the video frames are generated using a graphics pipeline as implemented by the GPU 716 and controlled by the CPU 702. Asset awareness by the CPU 702 and GPU 716 provides for identification and tracking of assets used in the graphics pipeline, such that a minimum of assets (e.g., minimum level of detail—LOD) can be used for processing through the graphics pipeline when generating a corresponding video frame. The computing architecture 200 may be implemented in the client devices 110 and/or the cloud gaming network 190 (e.g., in the game server 160 and/or the game title processing engines 111 and 111') of FIGS. 1A-1C.

The computing architecture 200 includes CPU 702 that is configured for executing the game. In particular, CPU 702 generates a draw call for a frame of the video frames, the draw call including instructions. Further, assets may be required by the instructions of the draw call during execution in the graphics pipeline. For a particular video frame, there may be multiple draw calls that are generated by the CPU 702 and executed by the GPU 716. As processing power increases, games are designed to render ever more complex scenes during gameplay. As a result, games are pushing more and more draw calls for each video frame to generate a scene (e.g., a forest scene, an ocean scene, etc.) used during gameplay of the game. The game code executing on the CPU 702 anticipates when the assets are needed (e.g., by one or more draw calls for a video frame) and coordinates the loading of assets into system memory 220 before actual use so that they are available to the GPU 716 for rendering the scene through a graphics pipeline at the appropriate time.

A GPU API 250 may be used to communicate between components or between applications running on the components of the computing architecture 200. For example, the GPU API 250 may be running on or called by the CPU 702 to communicate with another component, such as the graphics processing unit, system memory, command buffers, asset store, etc. The GPU API 250 may be running on processors within the asset store controller 230 or the GPU 716, to communicate with the other components; in some embodiments, the GPU API 250 may be partially implemented as fixed function hardware (rather than a general purpose CPU) for the purpose of this communication.

For asset awareness, the game executing on the CPU 702 generates additional information regarding assets used for each draw call. For example, this asset aware data (AAD) may include an identifier (e.g., asset ID) for a corresponding asset, a minimum LOD that must be loaded into system memory before the corresponding draw call can be executed in the graphics pipeline, and priority of the loading of the asset in comparison with loads of other assets used in other draw calls or within this draw call. At least some of the AAD (e.g., asset IDs) for a draw call is delivered using the GPU API 250 from the game executing on the CPU 702 to a corresponding command buffer holding the commands for the draw call. In addition, at least some (if not all) of the AAD for a draw call may be delivered using the GPU API 250 from the game executing on the CPU 702 to the asset store controller 230 in order to coordinate loading of assets used in the graphics pipeline for the draw call. In some embodiments, all of the AAD is delivered to the asset store controller 230.

The computing architecture 200 includes GPU 716 configured for implementing a graphics pipeline. For example, a graphics pipeline may be implemented by the GPU 716 to perform shader programs on vertices of objects within a scene to generate texture values for pixels of a display, wherein the operations are performed in parallel through a GPU 716 for efficiency. In general, the graphics pipeline receives input geometries (e.g., vertices of objects within a gaming world). A vertex shader builds the polygons or primitives that make up the objects within a scene. The vertex shader or other shader programs may perform lighting, shading, shadowing and other operations for the polygons. The vertex shader or other shader programs may perform depth or z-buffering to determine which objects are visible in a scene that is rendered from a corresponding viewpoint. Rasterization is performed to project objects in the three dimensional world to a two-dimensional plane defined by the viewpoint. Pixel sized fragments are generated for the objects, wherein one or more fragments may contribute to the color of a corresponding pixel when displaying the image. The fragments are merged and/or blended to determine a combined color of each of the pixels, which are stored in a frame buffer for displaying.

In addition, games may use assets of varying types for graphics processing as controlled by the CPU 702 executing the game. These assets may be used by the GPU 716 in the graphics pipeline for generating scenes in the game, e.g. a forest scene may take as input tree textures and tree models that are processed through the graphics pipeline. As games evolve, the virtualized gaming world that is created through execution of the corresponding game will become more complex, and may require operation of shader programs to be performed on increasing numbers of vertices and/or textures of objects or models within the scene.

More particularly, GPU 716 of the computing architecture 200 is configured for executing draw call commands to generate a video frame using LOD data. More specifically, the GPU 716 uses at least a minimum of LOD data based on asset aware data that is known to the components of the asset aware computing architecture 200. As previously described, the video frame may require execution of one or more draw calls, wherein each draw call may require one or more assets (e.g., textures, models, etc.). These assets can only be used by the GPU 716 if they are loaded into system memory 220, but these assets are too large to all fit in system memory 220 simultaneously, so they are stored externally to it, e.g. on hard drives or solid state devices (SSDs). During execution of the game by the CPU 702, the game code executing on the CPU 702 anticipates when the assets are needed (e.g., by one or more draw calls for a video frame) and coordinates the loading of assets using a GPU API into system memory 220 before actual use so that they are available to the GPU 716 for rendering the scene through a graphics pipeline at the appropriate time. As scenes become more complex requiring larger texture data, the time to completely load the required assets may increase. As such, the graphics pipeline may be attempting to use assets before they have completed loaded.

In embodiments of the present disclosure, the asset aware computing architecture 200 allows the assets to become available for processing in the graphics pipeline without having the GPU 716 stall while waiting for assets to be completely loaded to system memory 220. Stalling may occur especially in traditional computing architectures when there are too many inputs (e.g., textures) provided for rendering a scene. For example, texture or model asset data may not be fully loaded for a video frame before a corresponding draw call is executed by the graphics pipeline. This is especially true when there is a scene-cut within the game, wherein the game transitions from one scene to another between two video frames (e.g. a scene change in a cinematic sequence, or start of interactive gameplay after a series of menus). In a traditional computing architecture, the graphics pipeline will stall to wait for the assets to fully load before continuing execution. On the other hand, the asset aware computing architecture 200 of the present embodiments is configured to begin execution of the graphics pipeline even though the assets (e.g., textures and/or models) have not been fully loaded. In particular, all the game (as executed by the CPU) has to do is to call the GPU API 250 (essentially as it always has been doing) for a draw call. Because the asset aware computing architecture 200 is able to load useable assets in a timely fashion, the game developer need not focus on tailoring the scenes (e.g., making them less complex) of the game for execution on more traditional computing architectures which may be slow or poorly functioning especially when rendering complex scenes or when switching between scenes in a scene-cut.

The asset aware computing architecture 200 includes an asset store 210 that is configured for storing a plurality of assets of the game. In some embodiments, the asset store 210 may be configured as a hard drive, or using SSDs. As memory technology evolves, other memory devices may be used for the asset store 210 that provides for ever faster access. In that manner, all assets used to render a scene may be loaded from the asset store 210 in milliseconds or tens of milliseconds, or even faster.

In embodiments, various communication and/or bus interfaces may be used to communicate with the asset store 210. For example, PCI Express (PCIe) may be used for accessing the asset store 210. In one embodiment, the non-volatile memory express or NVM Express (NVMe) defines an open logical device interface specification for accessing non-volatile storage media attached via the PCIe bus, wherein access to asset store 210 is implemented via NVMe for increased performance for access to memory devices in asset store 210.

The assets may be loaded into the asset store 210 upon loading the game for execution. In particular, the asset store 210 holds the LOD data 290 for a corresponding draw call, and holds all LOD data for all the draw calls. Each asset includes one or more LOD that can be used by a corresponding draw call. For example, a texture asset may be represented by a mip-map or texture map chain having one or more LOD, wherein each texture map (LOD) or mip-map (LOD) provides a different resolution or representation of the texture. For example, a texture map or mip-map may be an image that is mapped to the surface of an object or polygon. Texture mapping may be used to reduce the number of polygons for an object that need to be rendered. In addition, a model asset may represent an object. The asset may include one or more models (e.g., LODs) of varying resolution to represent that object. In that manner, the required model having the appropriate resolution for that asset may be selected for rendering through the graphics pipeline.

In addition, the asset store 210 includes asset aware data (AAD) for each asset, all or some of which will also be resident in the system memory 290. For example, each asset may be tagged by a corresponding identifier (e.g., asset ID), which may be stored in the asset store 210 in association with a corresponding asset. Also, each asset may include other data providing details of the asset. For example, the AAD for each asset may include information describing the set of LODs for that asset. This representative information may be stored in association with a corresponding asset in the asset store. The AAD data may be updated in asset-aware fashion in various ways, such as when the assets are generated locally by CPU 702 or GPU 716, or accessed from mass storage within rack, or accessed from within a data center, or accessed over a network. That is, the asset store 210 may be updated in an asset aware fashion from the rack, or somewhere else in the data center, or over the network, or from the game.

The asset aware computing architecture 200 includes system memory 220 configured for storing one or more LOD data 290 used by a corresponding draw call. In addition, the system memory 220 is loaded with LOD data for every draw call used to generate a corresponding video frame. In particular, in one embodiment, when the game executing on the CPU 702 uses the GPU API 250 at bind time to bind assets (e.g., texture, LOD data, minimum LOD data, etc.) to a corresponding draw call, the CPU 702 also requests to the asset store controller 230 that the LOD data 290 is loaded from the asset store 210 to system memory 220. This request to load LOD data into system memory 220 may be implemented as an extension of the GPU API 250, or by a separate API.

System memory 220 may include a plurality of command buffers 240. Each command buffer is configured for storing AAD 260 and the corresponding draw call commands, wherein the AAD and the commands are stored at bind time. GPU 716 may be made aware of the AAD 260 when accessing the command buffer to execute corresponding commands. In particular, the CPU 702 writes the AAD and commands of the draw call to the corresponding command buffer using GPU API 250. As shown in FIG. 2, command buffer 240a is used for generating video frame-F0 (e.g., frame 0). Command buffer 240a includes draw call commands 241 (e.g., commands 241a through 241n) and AAD for the corresponding draw calls. As previously described, the asset aware data for a corresponding asset may include one or more of asset IDs 261 for required assets (e.g., textures, models, etc.), and may also include pointers 262 to asset IDs 261 in the asset store 210 and/or system memory 220, minimum LODs 263 for the required asset IDs (and corresponding assets), load states 264 for the asset IDs, and load priorities 265 for each of the asset IDs (e.g., load priority of an asset over other assets required by the corresponding draw call, or other draw calls). For example, assets used in objects close to the camera may have a high or the highest priority. Subsequent video frames are rendered using similarly configured command buffers. For example, command buffer 240b is used for generating video frame-F1 (e.g., frame-1) . . . and command buffer 240n is used for generating video frame-Fn (e.g., frame-n).

In addition, a command may be generated by the CPU 702 and included in the command buffer to provide notification when a corresponding frame has been rendered. In one embodiment, the notification is provided when a corresponding asset of a video frame has been rendered. As such, the notification is generated by the GPU 716 executing the draw call commands in the graphics pipeline, and delivered using GPU API 250 to the asset store controller 230.

The asset aware computing architecture 200 includes an asset store controller 230 configured to manage the storing and accessing of assets in the asset store 210, and more particularly to manage the flow of asset aware information throughout the computing architecture 200. In one embodiment, the asset store controller 230 is configured as an "on-chip complex" or unit, which includes one or more co-processors. In another embodiment, the asset store controller 230 is configured as an application running on the CPU 702 with an assist from other on-chip units.

As previously described, the asset store controller 230 is configured to receive a stream of AAD information from the CPU 702 using the GPU API 250 for one or more draw calls used to generate a video frame, or using a separate API. For example, the AAD includes identification of all of the assets (e.g., asset IDs) needed for drawing and/or rendering a corresponding video frame, and the loading priority of each of those assets. For example, priority of the load of an asset is given in comparison to loads of other assets required by that draw call. The asset store controller may additionally prioritize the minimum LOD required for an asset when executing the draw call in the graphics pipeline.

On receiving asset information, the asset store controller 230 begins to load the one or more assets (e.g., LOD data) for a draw call from the asset store 210 into system memory 220 based on AAD (e.g., loading priority of assets). In particular, in one embodiment, the request for loading of the LOD data of the assets for the draw call occurs at essentially the same time as the commands for the draw call and the AAD for the draw call are being written to the command buffer. That is, the request for loading of the LOD data of the assets for the draw call occurs at bind time. By triggering the load of the LOD data of the one or more assets for the draw call at the time when the one or more assets are bound, at least the minimum LOD can be loaded for timely execution of the draw call in the graphics pipeline by the GPU 716. Moreover, bind time triggering of the loading of at least the minimum LOD of assets required for a draw call reduces the occurrences of GPU stalls, where the GPU 716 waits for required assets to load. It is not necessary that the request for loading of the LOD data occur at the bind time; in another embodiment, AAD is written to the command buffer with the draw call commands, and separately and at another time AAD is sent to the asset store controller 230 to request a load of the assets.

In one embodiment, the loading is done according to priority. For example, the "minimum LOD" for all textures is first loaded, and then higher LODs are loaded, based on the priority information. Also, some assets are prioritized over other assets for loading, such that a higher priority asset is first loaded (e.g., minimum LOD or higher LODs) over a lower priority asset (e.g., its minimum LOD or higher LODs). In one embodiment, on completion of load of the one or more assets, GPU 716 is notified (using the asset ID) that a corresponding asset is loaded and to what degree that asset has been loaded (e.g., loading status of corresponding LODs). In another embodiment, GPU 716 is configured to access the load status, e.g. when the draw command is executed by the GPU 716.

Loading status may be determined by the asset store controller 230 that is configured to request and track loading of LODs of corresponding assets. In that manner, the load state of a corresponding asset may be communicated to the GPU 916 from the asset store controller 230, e.g. either directly using the GPU API 250, through the command buffer, or through a fetch of the load state by GPU 716. Because the AAD includes information relating to the minimum LOD and possibly the set of LODs for a particular asset, as well as the load state of an asset into system memory 220, the GPU 716 is configured to start executing a draw call using at least a minimum of LOD for a given asset. More particularly, the GPU 716 can determine what the highest LOD has been loaded for a particular asset for a corresponding draw call based on AAD (e.g., load state). As such, the GPU 716 can execute the draw call using the highest LOD that has been loaded, and not any higher LOD (e.g., LOD that has not been loaded).

Further, because asset awareness includes load state of a corresponding asset for a draw call, the GPU 716 is configured to determine whether the required LODs (e.g., minimum LOD) of a corresponding asset have been loaded to system memory. If the minimum LOD has not been loaded then the GPU can issue an "emergency load" request, for example to load the minimum LODs or a proxy asset (if the proxy asset is not already in system memory). The GPU may stall until the minimum LODs or proxy asset have been loaded. The emergency determination may be made before or while the draw call is being executed. For example, the asset store controller 230 and/or GPU 716 may make the determination while a previous draw call is being executed in the graphics pipeline, or before any draw calls have been executed by GPU 716 for the video frame that includes the usage of the asset. If the minimum LOD has not been loaded, then the asset store controller 230 or the GPU 716 may issue the "emergency load" request at that time.

The asset store controller 230 is also configured to deallocate system memory. In particular, a notification may be generated when the end of rendering of a video frame has been completed, as previously described. In addition, the AAD may include a notification from the command buffer of the end of rendering of a particular asset. The notification may be delivered using the GPU API 250 from the GPU executing draw call commands in the command buffer to the asset store controller 230, wherein the command buffer may include a command for generating and delivering the notification. In that manner, assets for that video frame may be targeted, such that memory spaces storing those assets may be freed. In addition, the asset store controller is configured to track usage of assets that are loaded to system memory (e.g. tracking usage of LOD data including such as how many times a texture was read). As such, an asset that has not been used for rendering a video frame may be targeted, such that memory spaces storing those assets may be freed. Assets may be freed in their entirety (all LODs) or only a subset of the LODs may be freed. In order to assist in making these determinations, in some embodiments the GPU 716 is configured to track usage of the assets, e.g. for textures the minimum and maximum LODs used and the number of overall accesses or accesses per LOD, for draw calls the number of pixels written as a result of the call and the execution or lack thereof of the draw call (some calls may be predicated), for models the LODs used and the vertex count generated. In some embodiments, usage of loaded LODs of partially loaded assets can be used to prioritize loading the highest LODs of these assets, e.g. if LOD 0 has not yet loaded for two assets, and LOD 1 can be seen to have substantial use for one asset but not for another, then LOD 0 of the asset with substantial LOD 1 use should take priority.

Manipulation of page tables, CPU caches and GPU caches may be required as part of the loading and freeing of system memory, and therefore the asset store controller, the CPU and the GPU may be configured to accelerate these operations. For example, the GPU 716 may be configured to accelerate the loading and freeing of system memory 220 by the asset store controller 230. The loading and freeing of memory by the asset store controller 230 requires manipulation of page tables and GPU caches 718, and as such the GPU 716 may be modified to accelerate these processes. In addition, the CPU 702 may be configured to accelerate the loading and freeing of system memory 220 by the asset store controller 230. The loading and freeing of memory by the asset store controller 230 requires manipulation of page tables and CPU caches (not shown), and as such, the CPU 702 may be modified to accelerate these processes.

In one embodiment, the CPU 702 is configured to query the asset store controller 230 as to what assets are currently in system memory 220, or what assets are used for a particular frame of graphics. The CPU 702 is also configured to query the asset store controller 230 for the contents of the asset store.

In another embodiment, the CPU 702 is configured to provide a hint to the asset store controller 230 as to loading a corresponding asset. The hint is not necessarily tied to any specific draw call that is being generated. For example, the hint may be configured as a request to load LOD data for an asset at a certain priority, wherein the LOD data may be used for a predicted draw call.

Figure 3:
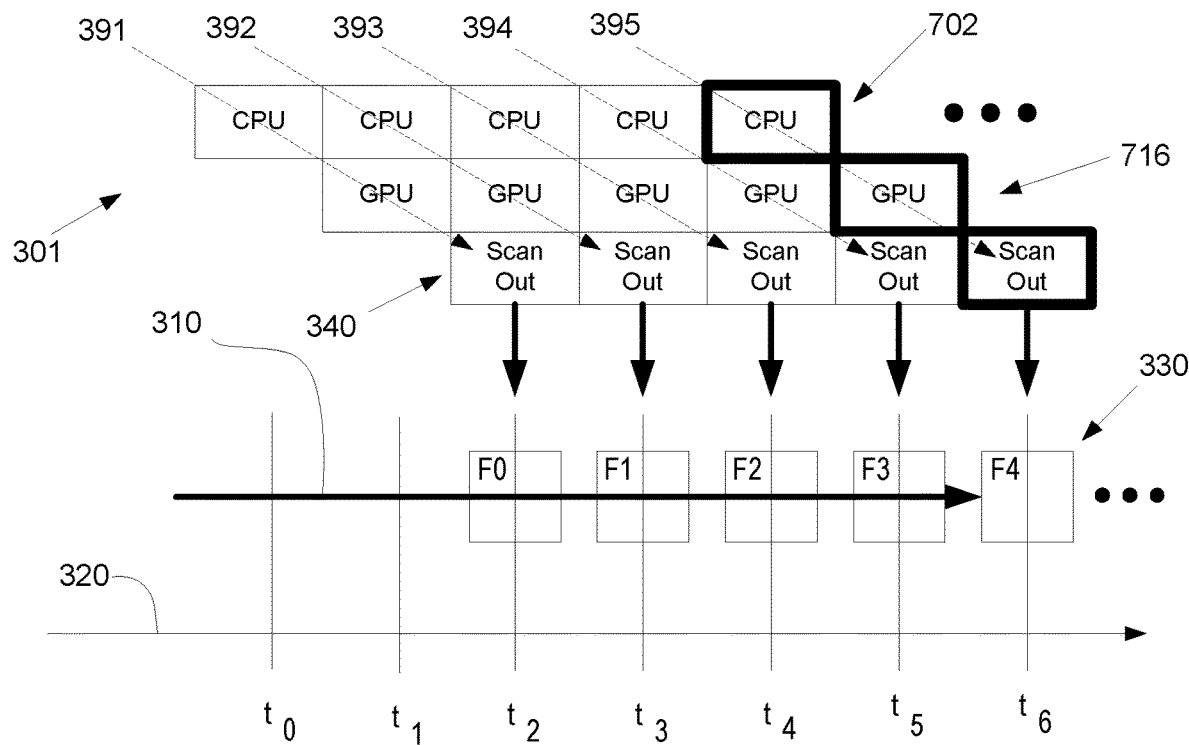
FIG. 3 illustrates a rendering pipeline of a computing system including a central processing unit and a graphics processing unit that are asset aware when generating video frames while the CPU is executing a game, in accordance with one embodiment of the present disclosure.

FIG. 3 illustrates a rendering pipeline of a computing system including a CPU 702 and a GPU 716 that are asset aware when generating video frames while the CPU 702 is executing a game, in accordance with one embodiment of the present disclosure. Frame updating is performed in time for a predetermined rate of frame rendering. For example, embodiments of the present disclosure may perform frame rendering at 60 frames per second. Other embodiments are suitable for performing frame rendering at slower or faster rates. The rendering pipeline 301 may be implemented within client device 110 and cloud game network 190, alone or in combination, as previously described.

In particular, the rendering pipeline includes a CPU 702, GPU 716 and memory that may be accessible to both (e.g., asset store 210, system memory 220, shared memory, vertex buffers, index buffers, depth or Z buffers, frame buffers for storing rendered video frames to be delivered to a display, etc.). The rendering pipeline (or graphics pipeline) is illustrative of the general process for rendering images, such as when using 3D (three dimensional) polygon rendering processes. For example, the rendering pipeline 301 for a rendered image outputs corresponding color information for each of the pixels in a display, wherein the color information may represent texture and shading (e.g., color, shadowing, etc.).

The CPU 702 may be generally configured to perform scene generation and/or object animation for a video frame of a game executing on the CPU 702. CPU 702 receives input geometries corresponding to objects within a 3D virtual environment. The input geometries could be represented as vertices within the 3D virtual environment, and information corresponding to each of the vertices. For example, objects within the 3D virtual environment can be represented as polygons (e.g., triangles) defined by vertices, wherein the surface of a corresponding polygon is then processed through the rendering pipeline 301 to achieve a final effect (e.g., color, texture, etc.). Also, texture and model information may be provided as inputs in the graphics pipeline. The operations of the CPU 702 are well known, and are generally described herein. Generally, CPU 702 implements object animation from frame-to-frame that may be hand-animated, captured from human actors and/or simulated depending on the forces exerted on and/or applied by the object (e.g., external forces such as gravity, and internal forces of the object inducing movement). For example, the CPU 702 performs physics simulations of the objects, and/or other functions, in the 3D virtual environment. The CPU 702 then issues a draw call for the polygon vertices that is performed by the GPU 716.

In particular, the animation results generated by the CPU 702 may be stored to a vertex buffer, which is then accessed by the GPU 716 which is configured to perform a projection of the polygon vertices onto a display or tessellation of the projected polygons for purposes of rendering the polygon vertices. That is, the GPU 716 may be configured to further build up the polygons and/or primitives that make up the objects within the 3D virtual environment, to include performing lighting, shadowing, and shading calculations for the polygons, which is dependent on the lighting for the scene. Additional operations may be performed, such as clipping to identify and disregard primitives outside of a viewing frustum, and rasterization for projecting objects in the scene onto the display (e.g., project objects to an image plane associated with a point-of-view of the user). At a simplistic level, rasterization includes looking at each primitive, and determining which pixels are affected by that primitive. Fragmentation of the primitives may be used to break a primitive to pixel sized fragments, wherein each fragment corresponds to a pixel in the display and/or a reference plane associated with the rendering point-of-view. One or more fragments of one or more primitives may contribute to a color of a pixel when rendering a frame on a display. For example, for a given pixel fragments of all primitives in the 3D virtual environment are combined into the pixel for the display. That is, overall texture and shading information for a corresponding pixel are combined to output a final color value for the pixel. These color values may be stored in a frame buffer, which are scanned to the corresponding pixels when displaying a corresponding image of a scene on a frame-by-frame basis.

As shown in FIG. 3, a rendering pipeline is shown to include operations performed in sequence by a CPU 702, GPU 716, and a raster engine for scanning out the rendered frames to a display 710. For illustration, rendering pipeline sequences 391-395 are shown for rendering frames F0 through F4. Because of space constraints, other pipeline sequences are not shown, such as the sequences for frames beyond F4. In the example shown in FIG. 3, each of the components of the rendering pipeline 301 operate in the same frequency of frame generation. For example, the CPU 702 and GPU 716 may operate at the same frequency of frame generation to render frames at a predefined frame rate through the rendering pipeline.

For example, in the first frame period marked as time t-0, CPU 702 performs physics and other simulation on objects, and delivers polygon primitives to the GPU 716 along with one or more draw calls for the video frame (e.g., F0). In the second frame period marked by time t-1, the GPU 716 performs primitive assembly and other tasks to generate a rendered frame (F0). The frame F0 is scanned out in the third frame period marked by time t-2. Similarly, pipeline sequence 392 renders frame F1 in the second and third frame periods, and scans out frame F1 in the fourth frame period marked by time t-3. Also, pipeline sequence 393 renders frame F2 in the third and fourth frame periods, and scans out frame F2 in the fifth frame period marked by time t-4. Similarly, pipeline sequence 394 renders frame F3 in the fourth and fifth frame periods, and scans out frame F3 in the sixth frame period marked by time t-5. Also, pipeline sequence 395 renders frame F4 in the fifth and sixth frame periods, and scans out frame F4 in the seventh frame period marked by time t-6.

Figure 4:
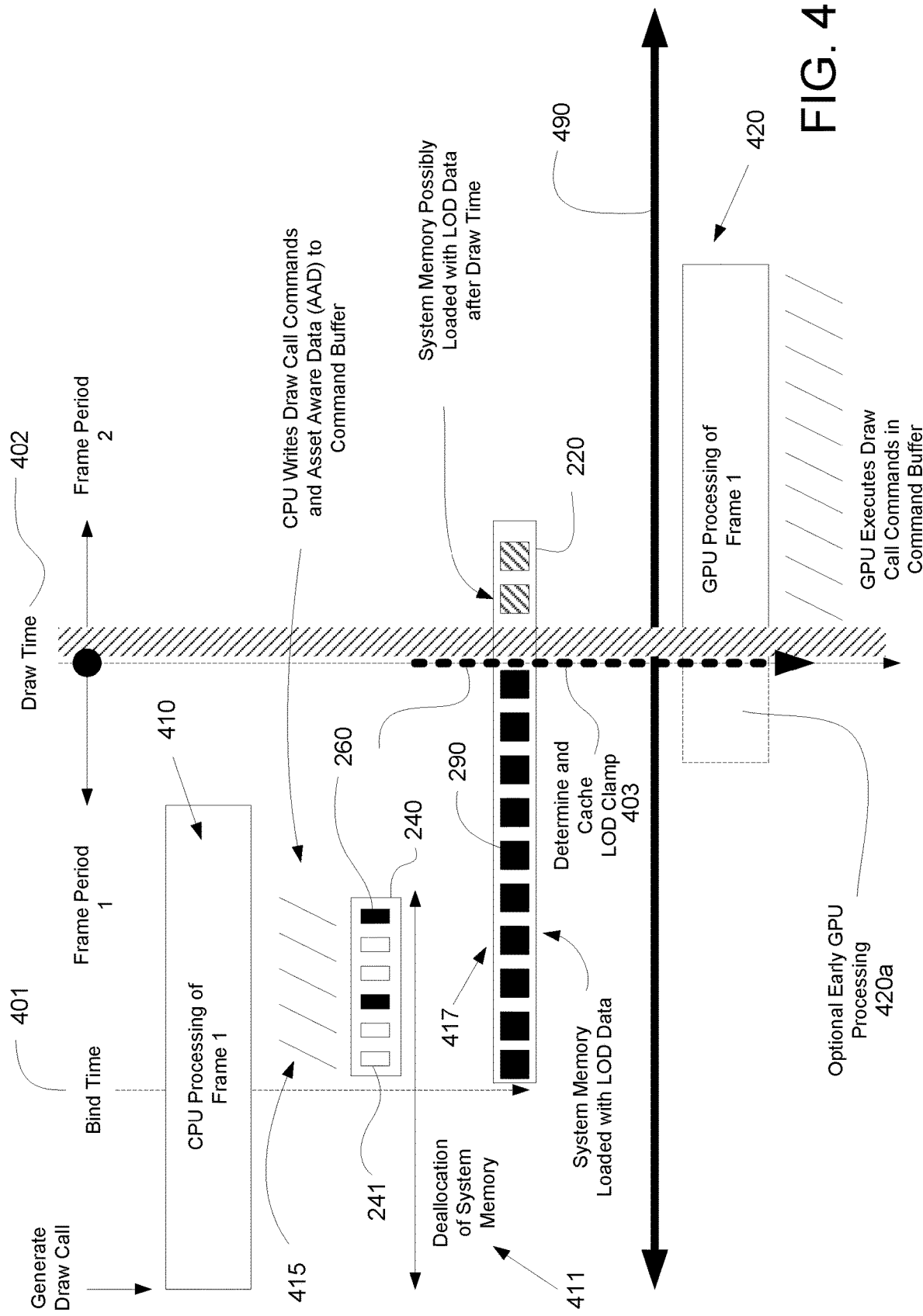
FIG. 4 illustrates the use of asset aware data by a computing system including a central processing unit and a graphics processing unit when generating video frames while the CPU is executing a game, in accordance with one embodiment of the present disclosure.

FIG. 4 illustrates the use of asset aware data by a computing system including a CPU and GPU when generating video frames while the CPU is executing a game, in accordance with one embodiment of the present disclosure. In particular, a portion of the rendering and/or graphics pipeline is shown for rendering a video frame and includes operations performed in sequence by the CPU 702 and GPU 716. As shown, the rendering pipeline is referenced to timeline 490. A draw time 402 is shown; it spans the time period from when the GPU 716 begins execution of the draw call to when the GPU 716 completes processing for it. Draw time 402 separates frame period 1 and frame period 2.

Within and/or starting before frame period 1, CPU 702 processes video frame 1 through execution of a game at operation 410. In particular, one or more draw calls are generated for the video frame, wherein the draw calls are executed by the GPU 716. At bind time 401, the CPU 702 binds assets required by the one or more draw calls for rendering a portion of the video frame. More specifically, at bind time 401 the CPU 702 writes commands 241 (clear boxes) for each draw call to a corresponding command buffer (e.g. 240). As shown, at operation 415 the CPU 702 writes to the command buffer 240 commands 241 for a draw call and the AAD 260 (darkened boxes) using a GPU API 250 beginning from the bind time 401. The commands 241 and the AAD 260 may be written in an orderly fashion (e.g., sequentially) or in an unorderly fashion (e.g., interleaved) with each other.

In addition, assets 417 required by the one or more draw calls needed to render the video frame are loaded to system memory 220 beginning at bind time 401. The assets 417 include one or more LOD data 290, including a minimum LOD that may be used when the corresponding asset is used to render a video frame. The loading of LOD data 290 to system memory 220 begins without waiting for the CPU 702 to complete writing of all commands required for the generation of the video frame to the command buffer 240, though if the asset store controller 230 is busy with executing other load operations such as higher priority LOD data, there may be a delay before the LOD data of assets 417 is loaded into system memory 220. Deallocation of system memory 411 may need to be performed prior to loading of LOD data 290 for assets 417.

In the asset aware computing architecture including the CPU 702 and GPU 716, the loading of LOD data may be tracked, as previously described. In that manner, the GPU 716 and/or an asset controller 230 may be configured to determine whether a minimum LOD has been loaded for a corresponding asset. If so, then the GPU 716 can proceed to render the video frame using the minimum LOD for the corresponding asset. If not, then the GPU 716 and/or the asset controller can issue a request for an emergency load of the minimum LOD data. The determination of load status and request for an emergency load might be made at the draw time 402, during the execution of a previous draw call, at the commencement of the GPU processing of the frame 1 shown in operation 420, or at another time. As previously described, the asset store controller may notify the GPU of the load status of an asset for a corresponding draw call, or the GPU may be configured to query and/or fetch the load status from the asset store controller. In some embodiments, conditional commands in the command buffer may be used to query load status of the LOD data of assets 417 and alter the command flow, e.g. to skip a draw call entirely if the minimum LOD has not been loaded (i.e. to avoid a stall in the GPU), to render using proxy assets or to allow for customized rendering based on the loaded LODs. In still other embodiments, the GPU may use the AAD to make these same determinations, e.g. to skip a draw call entirely if the minimum LOD data has not been loaded (i.e. to avoid a stall in the GPU).

The usage of LOD data may also be controlled using a LOD clamp 403. In order that the GPU 716 not attempt to use LOD data that has not yet been loaded into system memory, at draw time 402 or an earlier time the GPU caches the number of the highest LOD loaded (e.g., LOD clamp), and only uses LOD data that was determined to be in system memory prior to the commencement of the draw call, i.e. access to the LOD data is clamped at LOD clamp 403. For example, the LOD clamp may be cached at draw time 402, during execution of one or more previous draw calls, or at the start of an entire frame of rendering.

Within and/or starting before frame period 2, GPU 716 renders the video frame (e.g., frame 1) at operation 420. As previously described, there may be an optional early processing at operation 420a by the GPU 716 to determine if a minimum of LOD has been loaded for a particular asset for a corresponding draw call, even before the draw call has been issued based on AAD and tracking of the loading of that asset.

Figure 5:
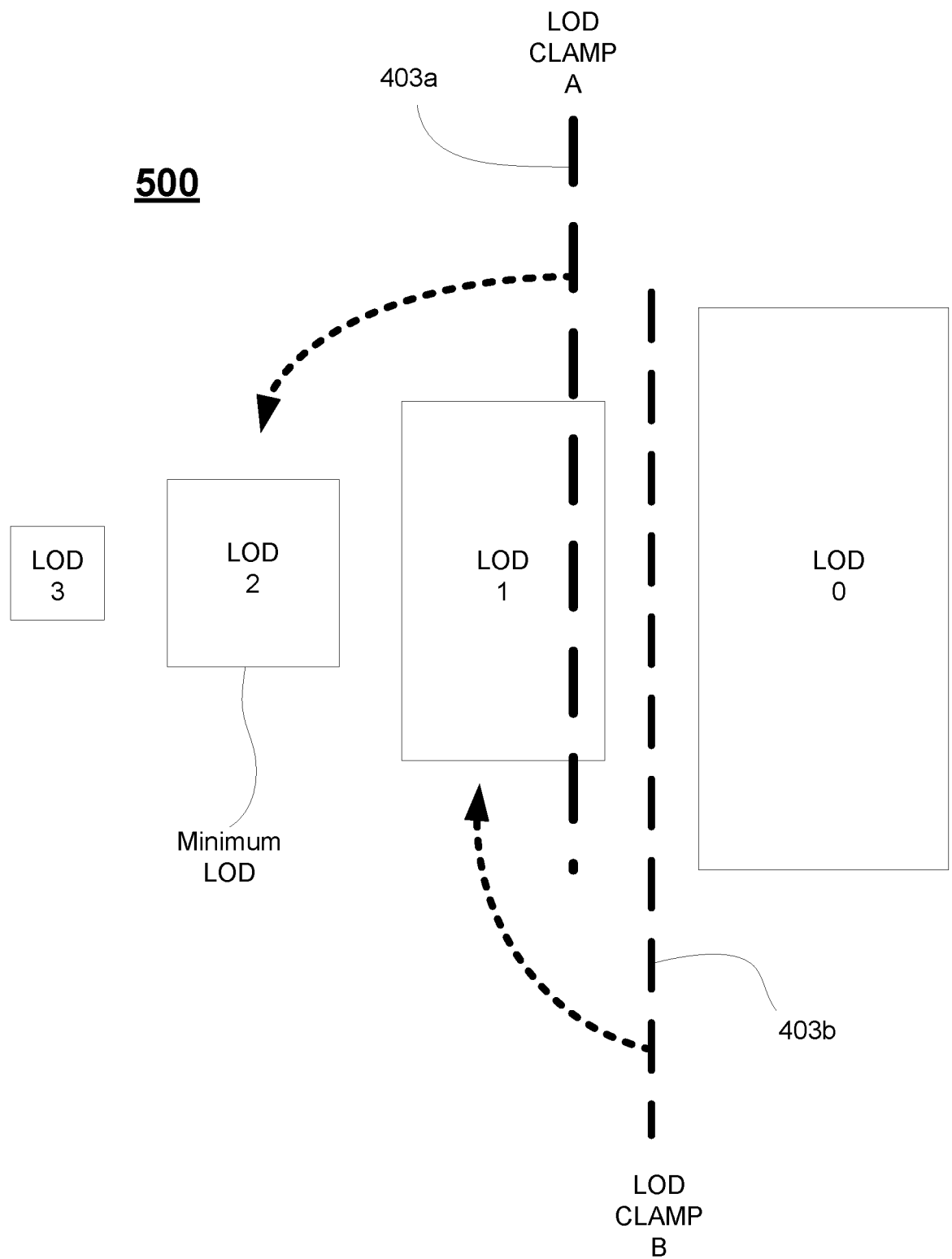
FIG. 5 is an illustration of level of detail data for a corresponding asset used when generating video frames for a game executed by a central processing unit and the implementation of a load clamp during the loading of the LOD data, in accordance with one embodiment of the present disclosure.

FIG. 5 is an illustration of level of detail data for a corresponding asset used when generating video frames for a game executed by a central processing unit and the implementation of a load clamp during the loading of the LOD data, in accordance with one embodiment of the present disclosure. The term LOD data and LOD may be used interchangeably, such as those corresponding to an asset and/or multiple assets. In particular, LOD data is shown for a corresponding asset. The LOD data may include LOD 0, LOD 1, LOD 2, and LOD 3 of varying resolution, as previously described, where according to convention LOD 0 has the highest detail and LODs 1, 2 and 3 have progressively lower detail. For example, for a texture asset the LOD data may be a mip-map chain of textures. For the asset, a minimum LOD is defined as LOD 2, wherein the minimum LOD may be used for the asset during a draw call executed in a graphics pipeline, i.e. the draw call may proceed without higher LODs 1 or 0 but cannot proceed without LODs 3 and 2 in system memory.

A LOD clamp may be implemented to ensure that the GPU 716 does not attempt to use LOD data that has not yet been loaded into system memory. At draw time 402 or an earlier time the GPU caches the number representative of the highest LOD loaded. The cached value for the LOD clamp is used by the GPU when executing the draw call, such that the GPU will clamp its access of LOD data (e.g., texture and/or model) for a corresponding asset to this cached value for the LOD clamp, so as to not exceed it and try to access something not in memory. That is, the LOD clamp is used to ensure that LODs that have not yet been loaded (e.g., at draw time 402) are not attempted to be used by the GPU when executing the draw call. In addition, the LOD clamp is used to ensure that the same set of LOD data is used throughout execution of the draw call, such that LOD data that arrives for loading into system memory after the draw time 402 (e.g., during execution of the draw call) is not used for execution of the draw call.

In FIG. 5, one example of an LOD clamp is shown by line 403a. In this example, at draw time 402 the LOD 3 and LOD 2 had been completely loaded, but LOD 1 was only partially loaded, so the LOD clamp is set to a LOD value of 2 (representative of LOD 2). The GPU 716 is configured so that it will not use LOD values higher than the LOD clamp. For example, even if a primitive using a texture is close to the camera and would ordinarily render using LOD 1 or 0, if the LOD clamp is set to 2 these higher LODs will not be used.

Also in FIG. 5, another example of a LOD clamp is shown by line 403b. In this example, at draw time 402 LOD 1 had been completely loaded, and therefore the LOD clamp is set to a LOD value of 1 and LOD 1 will be used by GPU 716 when executing the draw call. In some embodiments, the LOD clamp is set at draw time; in other embodiments, it is set earlier within GPU processing of the frame 420, or at still earlier times such as the beginning of GPU processing of frame 420.

Figure 6A:
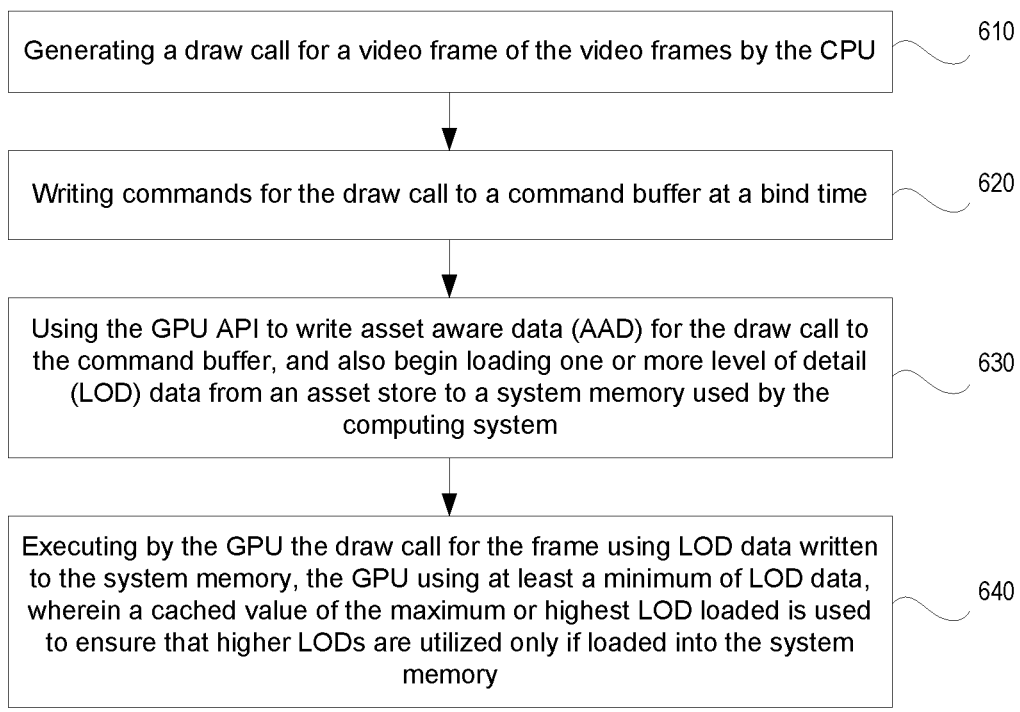
FIG. 6A is a flow diagram illustrating a method for executing a game by a computing system that uses a central processing unit and a graphics processing unit for generating video frames, in accordance with one embodiment of the present disclosure.

With the detailed description of the various client devices 110 and/or the cloud gaming network 190 (e.g., in the game server 160 and/or the game title processing engines 111 and 111') of FIGS. 1A-1C and 2, flow diagram 600A of FIG. 6A illustrates a method for executing a game by an asset aware computing system that uses a central processing unit and a graphics processing unit for generating video frames, in accordance with one embodiment of the present disclosure.

At 610, the method includes generating a draw call for a video frame of the video frames by the CPU. The draw call is generated during execution of a game by the CPU. As previously described, one or more draw calls may be generated in association with rendering a video frame.

For example, the draw call is generated during a cut-scene defining a transition between a previous scene and a new scene. Drawing the new scene may require many assets to be loaded into system memory. However, the asset aware computing architecture is able to render the new scene using a minimum of LOD data, thereby reducing the chance of GPU stalls.

At 620, the method includes writing commands for the draw call to a command buffer at a bind time. In particular, the game executing on the CPU uses a GPU API to bind at bind time one or more assets required by the draw call when processed through the graphics pipeline, i.e. it uses the GPU API to write commands related to the assets to the command buffer.

At 630, the method includes writing asset aware data (AAD) for the draw call to the command buffer, and also begin loading one or more LOD data from an asset store to a system memory. In particular, AAD may be generated or accessed and/or determined as the game is executing on the CPU for each draw call. For example, the AAD may include identifiers (e.g., asset IDs) for each asset required by a corresponding draw call, a minimum LOD for each asset that can be used for rendering the draw call, and loading priority for each asset to system memory in comparison to priorities of other assets required by the corresponding draw call.

When the CPU writes the draw call commands and the AAD to the command buffer (using a GPU API), it also requests the asset store controller to load one or more LOD data for the draw call into system memory used by the computing system. At the time the request is made to the asset store controller, LOD data begins loading but the actual loading of the one or more LOD data may not necessarily be occurring yet. For example, a first plurality of LOD data for an asset begins to load in system memory, wherein the asset is used when processing the draw call, and wherein the first plurality of LOD data includes a minimum LOD. In particular, an asset store controller is configured to receive a stream of information, including the AAD for the one or more assets required by a draw call. The AAD includes identifiers for the assets needed to draw a video frame, asset loading priorities, and a notification of the end of the rendering for the video frame that uses those assets. The LOD data is loaded from an asset store to the system memory by the asset store controller. As previously described, the CPU may make a request using the GPU API to the asset store controller at bind time to load the LOD data, in one embodiment, e.g. sending the request with the AAD. Also, when the AAD is received by the asset store controller, the AAD may be used to request the LOD data such that receipt of the AAD triggers the loading of the one or more LOD data from the asset store to the system memory, in another embodiment.

The asset store controller is configured to coordinate loading of assets into system memory, and also to notify the GPU of load status by some means, such as writing the load status into the AAD in the command buffer in one embodiment. Also, a conditional command may be placed into the command buffer for execution such that the GPU queries and/or fetches from the asset store controller the load status of an asset (e.g., LOD data) used in a draw call.

In addition, the asset store controller is configured to manage deallocation of system memory. In particular, the CPU and/or the asset store controller is notified by the GPU that the draw call has been executed. For example, a command may be placed into the command buffer for a draw call to generate a notification indicating that the draw call has completed rendering a video frame, and delivering the notification to the CPU and/or the asset store controller. In that manner, the memory space storing the one or more assets used by the draw call can be freed. In another embodiment, the asset store controller can track the use of assets stored in system memory. When an asset has not been used for rendering a current video frame in the graphics pipeline, the asset store controller can determine that the asset is no longer needed for processing draw calls, and can free up the corresponding memory space.

At 640, the method includes executing by the GPU the draw call for the frame using LOD data written to the system memory. The CPU issues the draw call to the GPU for execution at the next draw time (e.g., in a current frame period), wherein the draw call was generated by the CPU in a previous frame period. In that manner, the video frame can be rendered in time for scanning out in the next frame period. The GPU uses at least a minimum of LOD data to execute the draw call, based on the AAD. For example, each asset has a minimum LOD that can be used for processing a corresponding draw call requiring the corresponding asset. Because the asset aware computing architecture (e.g., the CPU and/or the asset store controller running in conjunction with the GPU) is able to track the loading of assets (e.g., determine loading state of each asset), the GPU can determine which LOD to use for a corresponding asset when the draw call requiring that asset is executed. For example, for the asset introduced above, the loading of the first plurality of LOD data into system memory is tracked by the CPU and/or the asset store controller. In that manner, the CPU and/or the asset store controller doing the tracking is able to call the GPU API to or otherwise notify the GPU of the load state for that asset (e.g., to what degree the first plurality of LOD data has been loaded). Also, the GPU is aware of the first plurality of LOD data associated with the asset. In one embodiment, a cached value of the maximum or highest LOD data loaded to system memory is used to ensure that higher LODs are utilized only if loaded into system memory, as more fully described in relation to FIG. 6B below.

Figure 6B:
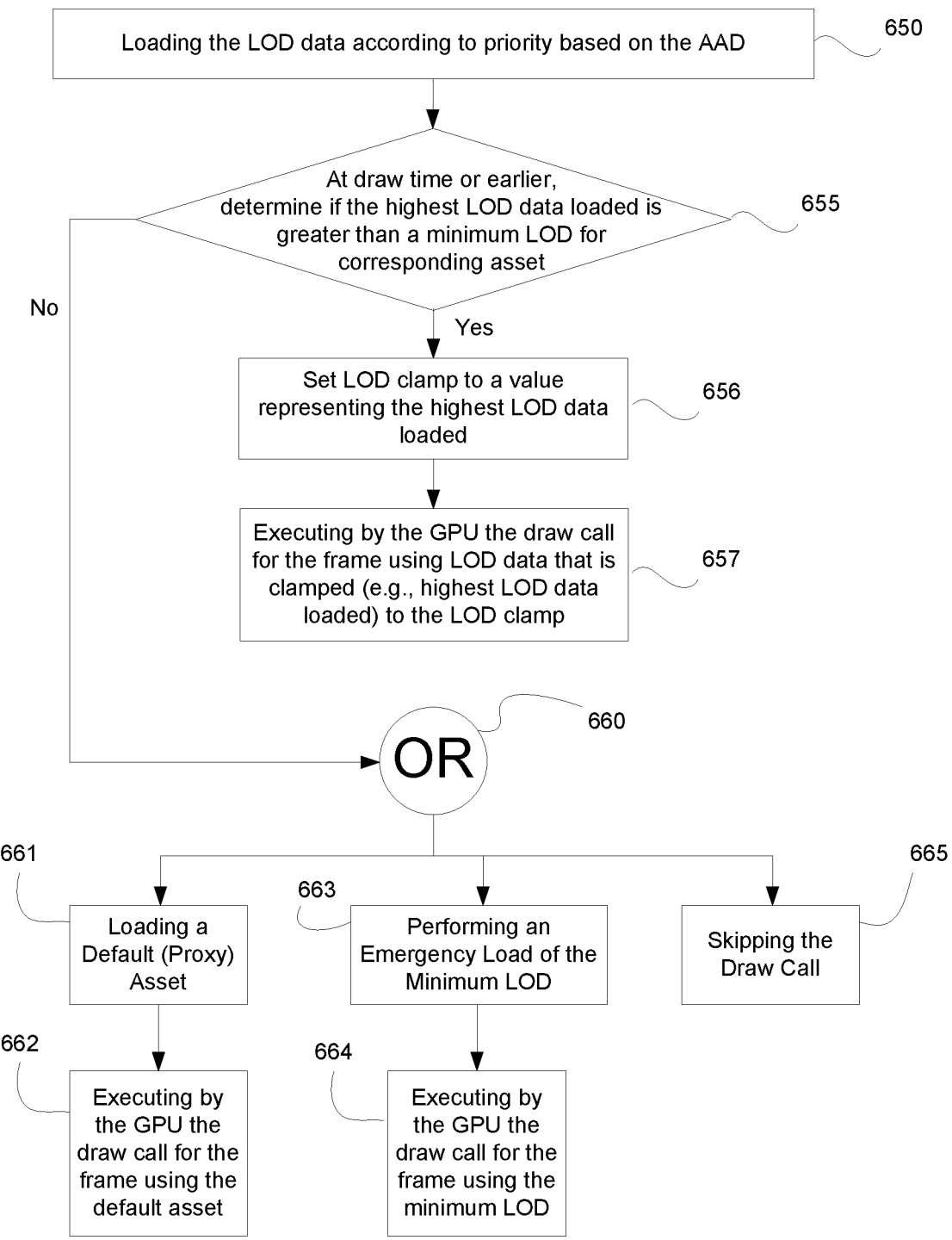
FIG. 6B is a flow diagram illustrating the consideration of a load status of a LOD data for an asset when executing a corresponding draw call to generate a video frame, in accordance with one embodiment of the present disclosure.

FIG. 6B is a flow diagram 600B illustrating the consideration of a load status of a LOD data for an asset when executing a corresponding draw call to generate a video frame, in accordance with one embodiment of the present disclosure. As previously described, the LOD data for a draw call is loaded into system memory. In particular, the LOD data is loaded according to priority based on AAD at 650. For example, LOD data for a corresponding asset may be prioritized to load LOD data in a certain order, such as first loading a minimum of LOD data from a plurality of LOD data for all assets in an order based on the priority in the AAD, and then subsequently loading remaining LOD data from lowest to highest detail, again in an order based on the priority in the AAD.

The GPU and/or command buffer may perform one of different actions depending on the load state, as described below. That is, the GPU and/or the command buffer may have a predication that allows it to perform different actions based on the LOD load state. In particular, some calls and/or commands within a corresponding draw call may be predicated based on LOD load status. For example, the command buffer may have branch instructions, or their equivalent, that when executed perform different actions based on LOD load state; for example, the LOD load state may be checked using these branch instructions and if certain LODs are loaded, then one set of commands is executed; however if not, then another set of commands are executed.

At decision step 655, a comparison is made between the highest LOD data that has been loaded into system memory and the minimum of LOD data required for a corresponding asset based on AAD. This comparison may be made at draw time, or earlier, as previously described. For example, the comparison may be made during execution of one or more previous draw calls, or at the start of an entire frame of rendering, etc.

The GPU is configured to use at least the minimum LOD for an asset, and may use the highest LOD that has been loaded that is also higher than the minimum LOD when processing the draw call to render a corresponding video frame. For LOD usage higher than the minimum LOD, the GPU utilizes an "LOD clamp," which is a cached value of the highest LOD fully loaded in system memory at the execution of the draw call (e.g., at draw time) or a previous time. In this case, the GPU is configured to ensure that the minimum of LOD data is in place and stored to system memory. Also, the LOD clamp is used to ensure that higher LODs (e.g. higher than the minimum of LOD data) are utilized only if loaded into system memory, i.e., the LOD clamp is used by the GPU to ensure that higher LOD data that are not loaded when determining the LOD clamp are not accessed during execution of the corresponding draw call. For example, at 656 the LOD clamp is set to a value representing the highest LOD data that has been loaded, i.e., the LOD clamp is the captured LOD load state. In this way, the GPU avoids attempting to access LOD data that has not yet been loaded into system memory. As such, at 657, the draw call for the frame is executed by the GPU using LOD data that is clamped to the LOD clamp (e.g. using the highest LOD data loaded).

On the other hand, if the highest LOD data loaded is lower than the minimum of LOD for a corresponding asset at decision step 655, then various operations may be performed at 660. If the GPU determines that the minimum LOD has not been loaded into system memory, then the GPU and/or the asset store controller may make a request to load a default (i.e. proxy) asset at 661 into system memory for use when processing the corresponding draw call, should that asset not already be in system memory. The default asset is used by the GPU when executing the draw call at 662. Alternatively, an emergency load of the minimum of LOD data may be performed at 663, with the GPU stalling until the minimum of LOD data has been successfully loaded. In some embodiments, the emergency load may be triggered earlier, such as during a previous draw call, at the start of frame rendering, etc. The minimum of LOD data is used by the GPU when executing the draw call at 664. Alternatively, the GPU may determine to skip execution of the draw call at 665 (i.e. to avoid a stall in the GPU), as previously described.

Figure 7:
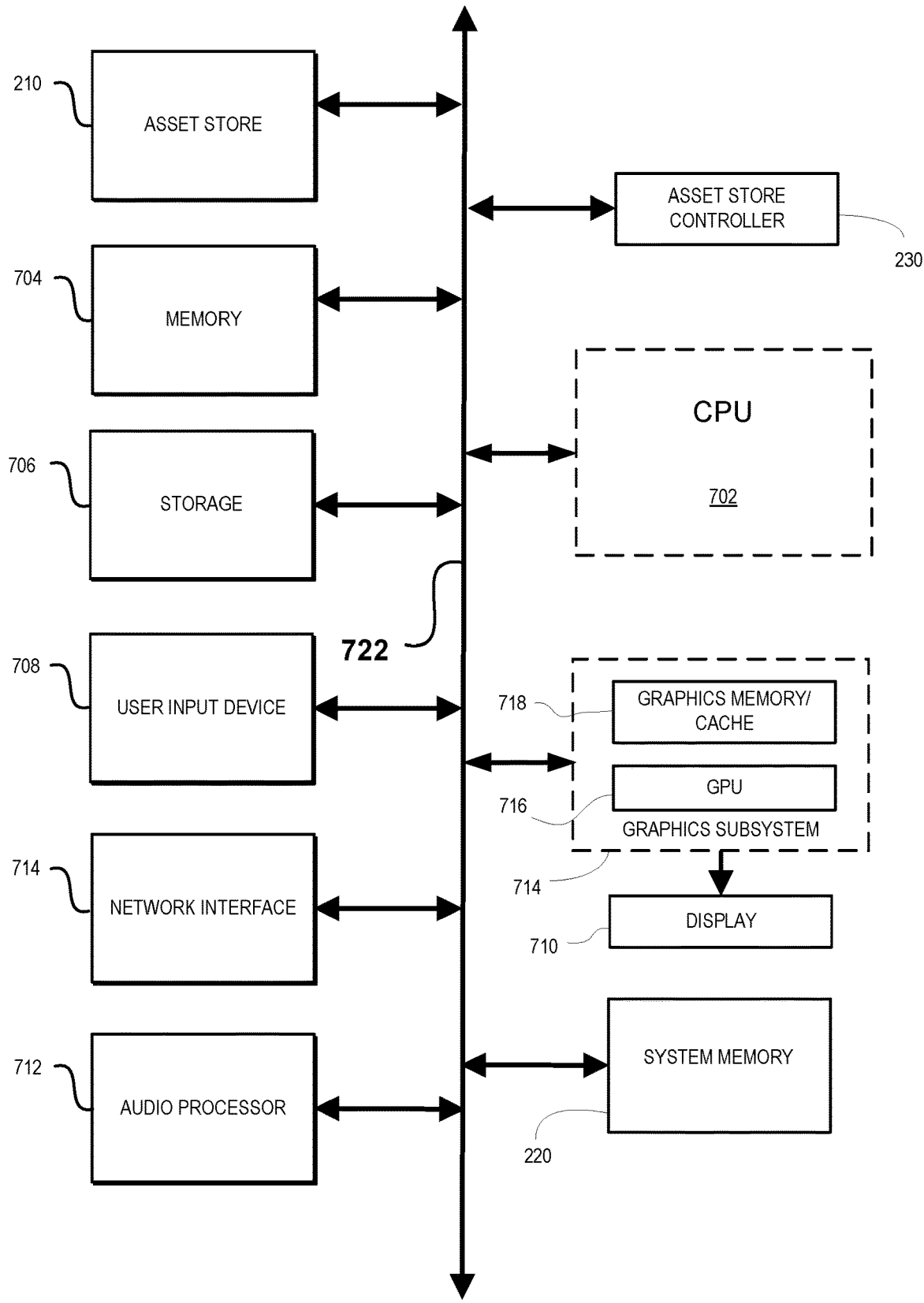
FIG. 7 illustrates components of an example device that can be used to perform aspects of the various embodiments of the present disclosure.

FIG. 7 illustrates components of an example device 700 that can be used to perform aspects of the various embodiments of the present disclosure. For example, FIG. 7 illustrates an exemplary hardware system suitable for executing a game by an asset aware computing system that uses a central processing unit and a graphics processing unit for generating video frames such that minimum LOD data may be used for one or more assets required by a draw call to render a video frame, in accordance with one embodiment of the present disclosure. This block diagram illustrates a device 700 that can incorporate or can be a personal computer, a server computer, gaming console, mobile device, or other digital device, each of which is suitable for practicing an embodiment of the invention. Device 700 includes a central processing unit (CPU) 702 for running software applications and optionally an operating system. CPU 702 may be comprised of one or more homogeneous or heterogeneous processing cores.

In accordance with various embodiments, CPU 702 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for graphics processing during execution of a game. An asset store controller 230 may exist as an independent unit, or the functions of the controller may be performed by CPU 702.

Memory 704 stores applications and data for use by the CPU 702, asset store controller 230 and GPU 716. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to device 700, examples of which may include keyboards, mice, joysticks, touch pads, touch screens, still or video recorders/cameras, and/or microphones. Network interface 714 allows device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of device 700, including CPU 702, graphics subsystem including GPU 716 and GPU cache 718, asset store controller 230, asset store 210, memory 704, system memory 220, data storage 706, user input devices 708, network interface 710, and audio processor 712 are connected via one or more data buses 722.

An asset store 210 may also be included to store assets required by a game when rendering scenes, for example. Asset store may be part of memory 704 and/or storage 706. System memory 220 stores assets used in draw calls when rendering scenes, for example, during the execution of the game.

A graphics subsystem 714 is further connected with data bus 722 and the components of the device 700. The graphics subsystem 714 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU 716, connected as a separate device with GPU 716, and/or implemented within memory 704. Pixel data can be provided to graphics memory 718 directly from the CPU 702. Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes 3D rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 714 periodically outputs pixel data for an image from graphics memory 718 to be displayed on display device 710, or to be projected by projection system 740. Display device 710 can be any device capable of displaying visual information in response to a signal from the device 700, including CRT, LCD, plasma, and OLED displays. Device 700 can provide the display device 710 with an analog or digital signal, for example.

Other embodiments for optimizing the graphics subsystem 714 could include multi-tenancy GPU operations where a GPU instance is shared between multiple applications, and distributed GPUs supporting a single game. The graphics subsystem 714 could be configured as one or more processing devices.

For example, the graphics subsystem 714 may be configured to perform multi-tenancy GPU functionality, wherein one graphics subsystem could be implementing graphics and/or rendering pipelines for multiple games, in one embodiment. That is, the graphics subsystem 714 is shared between multiple games that are being executed.

In other embodiments, the graphics subsystem 714 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g., if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g., a first shader operation) and compositing of outputs from slave GPU 2 and slave GPU 3, wherein slave GPU 2 could perform a second shader (e.g., fluid effects, such as a river) operation, the slave GPU 3 could perform a third shader (e.g., particle smoke) operation, wherein master GPU 1 composites the results from each of GPU 1, GPU 2, and GPU 3. In that manner, different GPUs can be assigned to perform different shader operations (e.g., flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, the present disclosure describes a computing system architecture including asset aware components such as a central processing unit and a graphics processing unit that generate video frames through a graphics pipeline, and a method for implementing the same in various embodiments. Asset awareness by the CPU and GPU provides for identification and tracking of assets used in the graphics pipeline, such that a minimum of assets (e.g., minimum level of detail—LOD) can be used for processing assets through the graphics pipeline when generating a corresponding video frame.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method for executing a game by a computing system that uses a central processing unit (CPU) and graphics processing unit (GPU) for generating video frames, comprising:
   generating a draw call for a video frame of the video frames by the CPU;
   writing one or more commands for the draw call to a command buffer at a bind time;
   writing asset aware data (AAD) for the draw call to the command buffer at the bind time, and begin at the bind time loading one or more level of detail (LOD) data from an asset store to a system memory used by the computing system by sending from the CPU at the bind time a request to an asset store controller to load the one or more LOD data from the asset store to the system memory; and
   executing by the GPU the draw call for the video frame using LOD data written to the system memory, the GPU using at least a minimum of LOD data based on the AAD.

2. The method of claim 1, further comprising:
   sending the AAD for the draw call to the asset store controller for storing, wherein receipt of the AAD as the request triggers the loading of the one or more LOD data from the asset store to the system memory.

3. The method of claim 1, further comprising:
   determining a highest LOD data that has been loaded to the system memory for an asset used by the draw call at initiation of processing of the draw call by the GPU;
   determining that the highest LOD data that has been loaded is lower in detail than a minimum LOD data for the asset; and
   requesting an emergency load of the minimum LOD data for the asset.

4. The method of claim 1, further comprising:
   determining a highest LOD data that has been loaded to the system memory for an asset used by the draw call prior to initiation of processing of the draw call by the GPU;
   determining that the highest LOD data that has been loaded is lower in detail than a minimum LOD data for the asset; and
   requesting an emergency load of the minimum LOD data for the asset.

5. The method of claim 1, further comprising:
   determining a highest LOD data that has been loaded to the system memory for an asset used by the draw call;
   determining that the highest LOD data that has been loaded is lower in detail than a minimum LOD data for the asset; and
   skipping the draw call.

6. The method of claim 1, further comprising:
   determining a highest LOD data that has been loaded to the system memory for an asset used by the draw call;
   determining that the highest LOD data that has been loaded is lower in detail than a minimum LOD data for the asset; and
   requesting a load of a proxy asset.

7. The method of claim 1, further comprising:
determining at a draw time for the draw call a highest LOD data that has been loaded to the system memory for an asset used by the draw call;
determining that the highest LOD data that has been loaded is higher in detail than a minimum LOD data for the asset;
setting an LOD clamp to a representative value of the highest LOD data;
storing the LOD clamp to a GPU cache; and
clamping the LOD data used during execution of the draw call to the highest LOD data based on the LOD clamp.

8. The method of claim 7, further comprising:
executing by the GPU a first command in the command buffer, the first command being configured to query a load status of the asset into the system memory.

9. The method of claim 7, further comprising:
tracking by the asset store controller the loading of a plurality of LOD data for an asset into system memory; and
using a GPU appication programming interface (API) by the asset store controller to notify the GPU of the load status for the asset.

10. The method of claim 1,
wherein each of one or more level of detail (LOD) data for a corresponding asset is a texture,
wherein each of the one or more LOD data for the corresponding asset is a corresponding mipmap.

11. The method of claim 1,
wherein each of one or more LOD data for a corresponding asset is a model.

12. The method of claim 1, further comprising:
notifying the CPU by the GPU that the draw call has been executed; and
freeing by the CPU memory space in system memory used for storing the one or more LOD data.

13. The method of claim 1, wherein the computing system is a distributed network of servers or a gaming console.

14. The method of claim 1, further comprising:
querying by the CPU the asset store controller as to assets stored in the system memory; or
querying by the CPU the asset store controller as to assets that are used for a corresponding video frame; or
querying by the CPU the asset store controller as to assets stored in the asset store.

15. The method of claim 1, further comprising:
tracking usage of one or more assets by the GPU to render the video frame.

16. The method of claim 15, further comprising:
tracking usage of one or more LOD data for a corresponding asset by the GPU.

17. The method of claim 15, further comprising:
tracking minimum or maximum LOD data used by the GPU for a texture asset; or
tracking number of accesses by the GPU to the texture asset; or
tracking number of accesses by the GPU to the texture asset by LOD data.

18. The method of claim 15, further comprising:
tracking minimum or maximum LOD data used by the GPU for a model asset; or
tracking vertex count used by the model asset.

19. The method of claim 15, further comprising:
using tracking information of usage of assets in determining one or more identified assets or one or more identified LOD data of the one or more identified assets to free from the system memory; or
using the tracking information of usage of assets to prioritize between freeing of two or more assets.

20. The method of claim 15, further comprising:
using tracking information of usage of assets to determine one or more identified assets or one or more identified LOD data of the one or more identified assets to load into system memory; or
using the tracking information of usage of assets to prioritize between loading of two or more assets.

21. The method of claim 1, further comprising:
updating the asset store in an asset aware fashion.

22. The method of claim 21, further comprising:
updating the asset store in the asset aware fashion when one or more assets are generated locally; or
updating the asset store in the asset aware fashion from within a data center; or
updating the asset store in the asset aware fashion over a network.

23. A method for executing a game by a computing system that uses a central processing unit (CPU) and graphics processing unit (GPU) for generating video frames, comprising:
generating a draw call for a video frame of the video frames by the CPU;
writing one or more commands for the draw call to a command buffer at a bind time;
writing asset aware data (AAD) for the draw call to the command buffer at the bind time, and begin at the bind time loading one or more level of detail (LOD) data from an asset store to a system memory used by the computing system;
executing by the GPU the draw call for the video frame using LOD data written to the system memory, the GPU using at least a minimum of LOD data based on the AAD;
determining prior to a draw time for the draw call a highest LOD data that has been loaded to the system memory for an asset used by the draw call;
determining that the highest LOD data that has been loaded is higher in detail than a minimum LOD data for the asset;
setting an LOD clamp to a representative value of the highest LOD data;
storing the LOD clamp to a GPU cache; and
clamping the LOD data used during execution of the draw call to the highest LOD data based on the LOD clamp.

24. A method for executing a game by a computing system that uses a central processing unit (CPU) and graphics processing unit (GPU) for generating video frames, comprising:
generating a draw call for a video frame of the video frames by the CPU;
writing one or more commands for the draw call to a command buffer at a bind time;
writing asset aware data (AAD) for the draw call to the command buffer at the bind time, and begin at the bind time loading one or more level of detail (LOD) data from an asset store to a system memory used by the computing system, wherein the begin at the bind time loading one or more LOD data includes:
loading a minimum LOD data from a plurality of LOD data for an asset; and
after loading the minimum LOD data for the asset, loading remaining LOD data from the plurality of LOD data from lowest to highest detail; and executing by the GPU the draw call for the video frame using LOD data written to the system memory, the GPU using at least a minimum of LOD data based on the AAD.

25. A method for executing a game by a computing system that uses a central processing unit (CPU) and graphics processing unit (GPU) for generating video frames, comprising:
generating a draw call for a video frame of the video frames by the CPU;
writing one or more commands for the draw call to a command buffer at a bind time;
writing asset aware data (AAD) for the draw call to the command buffer at the bind time, and begin at the bind time loading one or more level of detail (LOD) data from an asset store to a system memory used by the computing system; and
executing by the GPU the draw call for the video frame using LOD data written to the system memory, the GPU using at least a minimum of LOD data based on the AAD,
wherein the AAD includes for a corresponding asset used for the draw call a corresponding asset ID, a corresponding minimum LOD data, and a corresponding load priority of the corresponding asset over other assets being drawn for the video frame.

26. A method for executing a game by a computing system that uses a central processing unit (CPU) and graphics processing unit (GPU) for generating video frames, comprising:
generating a draw call for a video frame of the video frames by the CPU;
writing one or more commands for the draw call to a command buffer at a bind time;
writing asset aware data (AAD) for the draw call to the command buffer at the bind time, and begin at the bind time loading one or more level of detail (LOD) data from an asset store to a system memory used by the computing system;
executing by the GPU the draw call for the video frame using LOD data written to the system memory, the GPU using at least a minimum of LOD data based on the AAD; and
hinting by the CPU to the asset store controller to load LOD data for an asset according to priority information for the LOD data, wherein the asset is for a predicted draw call or object.

27. A computing system for executing a game to generate video frames, comprising:

a central processing unit (CPU) configured for executing the game, the CPU generating a draw call for a video frame of the video frames, the draw call including commands;
a command buffer configured for storing asset aware data (AAD) and the commands for the draw call, the AAD and the commands being written into the command buffer by the CPU at a bind time;
an asset store configured for storing a plurality of assets of the game including one or more level of detail (LOD) data used by the draw call;
a system memory configured for storing the one or more level of detail (LOD) data used by the draw call, loading of the one or more LOD data from the asset store being triggered by the CPU at the bind time by sending from the CPU at the bind time a request to an asset store controller to load the one or more LOD data from the asset store to the system memory, wherein the one or more LOD data begins loading to system memory while writing the AAD to the command buffer; and
a graphics processing unit (GPU) configured for executing the commands of the draw call for the video frame using LOD data written to the system memory, the GPU using at least a minimum of LOD data based on the AAD.

28. A non-transitory computer-readable medium storing a computer program for executing a game by a computing system that uses a central processing unit (CPU) and graphics processing unit (GPU) for generating video frames, the computer-readable medium comprising:
program instructions for generating a draw call for a video frame of the video frames by the CPU;
program instructions for writing one or more commands for the draw call to a command buffer at a bind time;
program instructions for writing asset aware data (AAD) for the draw call to the command buffer at the bind time, and begin loading at the bind time one or more level of detail (LOD) data from an asset store to a system memory used by the computing system by sending from the CPU at the bind time a request to an asset store controller to load the one or more LOD data from the asset store to the system memory; and
program instructions for executing by the GPU the draw call for the video frame using LOD data written to the system memory, the GPU using at least a minimum of LOD data based on the AAD.

* * * * *